United States Patent [19]
Constable

[11] 3,750,828
[45] Aug. 7, 1973

[54] ACCESS-CONTROL EQUIPMENT AND ITEM DISPENSING SYSTEMS INCLUDING SUCH EQUIPMENT

[75] Inventor: Geoffrey Ernest Patrick Constable, Cheltenham, England

[73] Assignee: Smiths Industries Limited, London, England

[22] Filed: Aug. 24, 1970

[21] Appl. No.: 66,181

[30] Foreign Application Priority Data
Aug. 25, 1969 Great Britain.................. 42,263/69

[52] U.S. Cl............ 221/2, 194/DIG. 9, 235/61.7 B, 340/149 A
[51] Int. Cl. ............................................. G06k 5/02
[58] Field of Search.................. 194/4, DIG. 9; 221/2; 235/61.7 B; 179/100.2 C, 100.2 MD; 235/61.12 M, 61.11 D, 61.7 B; 340/149 A

[56] References Cited
UNITED STATES PATENTS

| | | | |
|---|---|---|---|
| 3,401,830 | 9/1968 | Mathews................................ | 221/2 |
| 2,653,189 | 9/1953 | Camras...................... | 179/102.2 C |
| 3,039,582 | 6/1962 | Simjian........................... | 235/61.7 B |
| 3,570,643 | 3/1971 | Maierhofer......................... | 194/4 R |
| 2,832,839 | 4/1958 | Muffly........................... | 179/100.2 C |
| 3,559,175 | 1/1971 | Pomeroy......................... | 235/61.7 B |
| 2,938,962 | 5/1960 | Konins..................... | 179/100.2 MD |
| 3,239,824 | 3/1966 | Hare..................... | 179/100.2 MD X |
| 3,560,715 | 2/1971 | Akamatsu................ | 235/61.11 D X |
| 3,611,293 | 10/1971 | Constable et al............... | 340/149 A |

*Primary Examiner*—Robert B. Reeves
*Assistant Examiner*—Thomas P. Kocovsky
*Attorney*—William D. Hall, Elliott I. Pollock, Fred C. Philpitt, George Vande Sande, Charles F. Steininger and Robert R. Priddy

[57] ABSTRACT

A money-dispensing system is operative to dispense money in response to a bank customer's credit card and keyed-entry of his personal-identification number, only if this number accords with the customer's account number on the card and the card carries a magnetic recording having a crooked pattern of magnetization. The recording is detected by a magnetic head having a sensing gap of zigzag configuration, and contains data relating to the rate of permissible use of the token. The sensing gap may alternatively be of V configuration and may be defined by two obliquely set straight-gap heads. Recorded data relating to the extent of permissible use of the token may be detected using another crooked gap, and up-dated by erasure using a straight gap.

22 Claims, 5 Drawing Figures

ACCESS-CONTROL EQUIPMENT AND ITEM DISPENSING SYSTEMS INCLUDING SUCH EQUIPMENT

This invention relates to access-control equipment and item-dispensing systems including such equipment.

The invention is particularly concerned with access-control equipment of the kind for enabling access to a facility under control of a token presented to the equipment. The token, for example, may be in the form of a punched or embossed card, and each person authorized to make use of the facility may be issued with such a card for presentation to the equipment when access is required.

According to the present invention there is provided access-control equipment for enabling access to a facility under control of a token presented to the equipment, wherein detector means for detecting whether the token carries a magnetic recording has a magnetic sensing gap of crooked configuration, and operation of release means to enable access to the facility is inhibited in the event that a magnetic recording having a crooked pattern of magnetization corresponding to the gap-configuration is not detected on the token.

With the equipment of the present invention the detection of the existence of a magnetic recording on the presented token is used as a criterion for determining whether the request for access is to be granted. Earlier proposals in this respect have relied on magnetization of the token produced using a magnetic head having a conventional, straight gap-configuration and detection of this within the equipment using a head of the same straight-gap form. There is the danger with these proposals that anyone with fraudulent intent using a conventional magnetic head can in general determined the nature of the valid magnetization and record this on a token in a form that will be acceptable to the equipment and enable access to be gained. This danger is significantly reduced with the arrangement of the present invention since in this case it is necessary for the magnetic recording to be of a crooked pattern corresponding to the specific gap configuration used in the equipment. There is a wide range of possible variation in the shaping of the gap, and so provided knowledge of the particular shape is restricted, the likelihood of anyone with fraudulent intent being able to forge a magnetic recording of the appropriate pattern, or even with an authentic token being able to interfere profitably with the recording on it, is greatly reduced.

The detector device is the equipment of the present invention, as well as being used to detect the existence of the crooked-pattern magnetization, may be arranged to read out data recorded in it. Operation of the release means in these latter circumstances may be further inhibited in the event that the data-content of the read-out does not satisfy a predetermined criterion. The data read out from the token may relate in particular to the extent and, or alternatively, rate of permissible use of the token.

The sensing gap may be defined by a magnetic head that except for the crooked gap-configuration is of conventional form. The gap may in particular be of zigzag or simple V configuration. In the latter respect the V-gap may be defined by two straight-gap magnetic heads positioned obliquely to one another.

The access-control equipment of the present invention may be arranged to control access to any form of facility, for example, entry to a restricted area, use of a service, or withdrawal of an item in predetermined or selected quantity. One particular application of the equipment is in the field of banking where money-dispensing systems are provided for use by customers at all times, the customers being issued with individual coded-tokens for presentation to any one of the dispensing systems when withdrawal of money is required. The equipment of the present invention in this latter connection may be arranged to control an item-dispensing means that is operable to dispense money (for example, in bank-note form) to the customer in response to each valid 'request' for withdrawal, a valid 'request' in this context involving, at least, presentation to the equipment of a token bearing the appropriate crooked pattern of magnetization.

An item-dispensing system for use in dispensing money and including access-control equipment according to the present invention, will now be described, by way of example, with reference to the accompanying drawings, in which.

Figure 1:
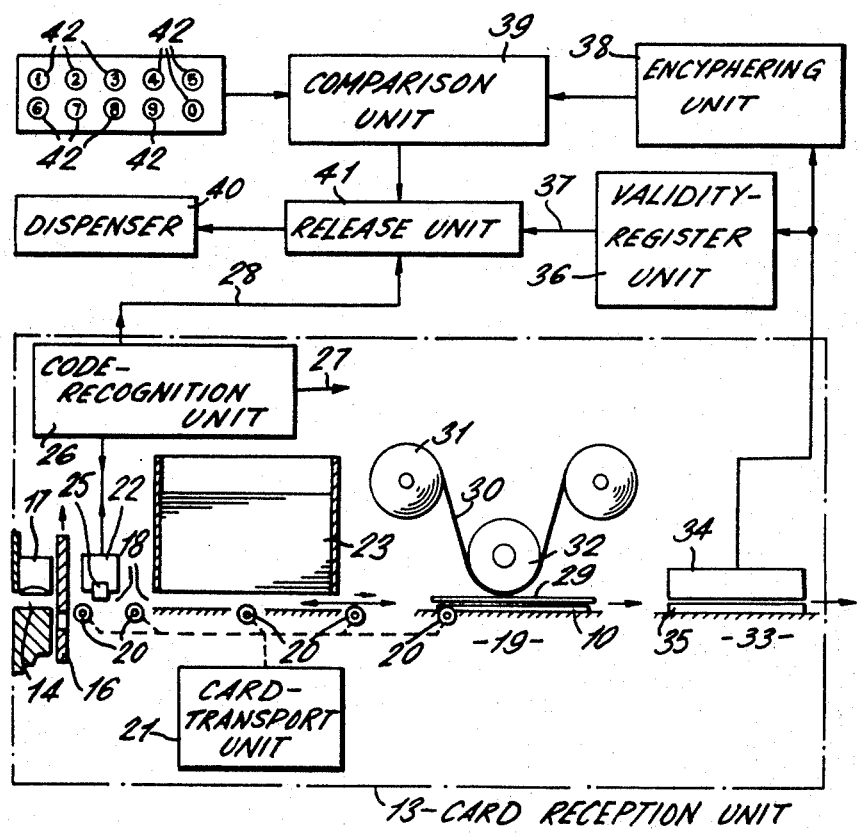
FIG. 1 is a schematic representation of the money-dispensing system.
Figure 2:
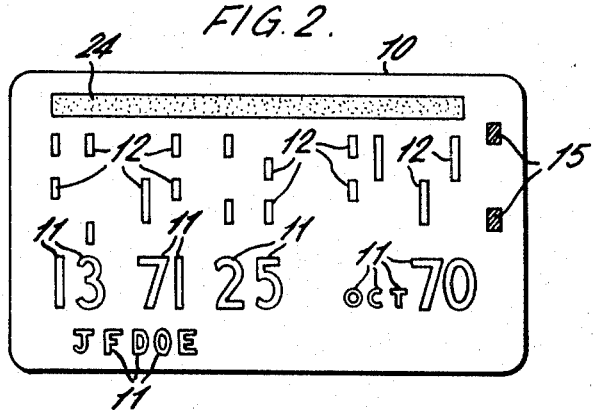
FIG. 2 shows the form of an information-bearing token used with the system of FIG. 1.

The money-dispensing system represented in FIG. 1 is operable to dispense packets of bank-notes, one at a time to authorized customers of a bank after, as well as during, normal banking hours. The customers authorized to use the system are each issued with a coded token in the form of a rectangular plastics card 10 that may be used generally as a credit card. Each card 10, as shown in FIG. 2, bears the data of expiry and numerical information identifying the account of the customer to whom the card has been issued, and this information, as well as being embossed directly on the card in alpha-numeric characters 11, is embossed thereon according to a two-out-of-five decimal code using bar-characters 12.

Each customer is informed of a secret, person-identification number that is individual to his account but cannot be deduced from the card 10 itself, and of a maximum, permissible rate of use of the card to withdraw packets of bank-notes. For the purpose of the present description it will be assumed that the maximum rate of withdrawal is once in any day.

When the customer wishes to withdraw a packet of bank-notes he presents his card 10 to a card-reception unit 13 of the system. The unit 13 has a facia that is mounted in an external wall of the bank to be accessible from outside and provide an entrance 14 for the card 10. The card 10, which as shown in FIG. 2 carries dark markings 15 at one end, is inserted in the entrance 14 lengthwise with the embossings 11 and 12 uppermost and with the markings 15 just within the unit 13. Entry of the card 10 further is blocked by an apertured shutter 16 until the existence, with appropriate location on the card 10, of the markings 15 is detected by a photoelectric detecting arrangement 17. Detection of the appropriately located markings 15 causes the shutter 16 to be lifted to admit the card 10 fully to the unit 13 through the entrance 14.

The card 10 admitted fully to the unit 13 is drawn lengthwise along a guideway 18 to an imprinter 19 by rollers 20 that are driven by a card-transport unit 21. In its passage along the guideway 18 the card 10 passes successively beneath a reading-recording head-unit 22 and a stack 23 of punched-card blanks. The head unit 22 reads from the card 10 withdrawal-rate information that is recorded magnetically in a strip 24 of ferromagnetic oxide inset, as indicated in FIG. 2, lengthwise of the card 10. The information in this case is provided by the date on which the card 10 was last used, and this date is recorded in binary-coded form as modulation of the frequency of an alternating-current signal that is recorded throughout the length of the strip 24.

The recording in the strip 24 is made using a special form of magnetic head having a recording gap of zigzag configuration, and so is characterized by a correspondingly crooked pattern of magnetization departing substantially from the pattern of straight, transverse bands produced using a conventional, straight-gap head. It is only by using the same head, or one having the same zigzag configuration of gap, that the recorded withdrawal-rate information can be read intelligibly from the card 10; the head unit 22 includes a magnetic head 25 having this specific crooked configuration of gap. The head 25 is located to lie over a point in the path of the strip 24 along the guideway 18, so as to read out the withdrawal-rate information from the strip 24 of the transported card 10.

Signals in accordance with the recorded withdrawal-rate information read from the card 10 by using the head 25 are supplied from the unit 22 to a code-recognition unit 26. The signals are there used as the basis for two security checks. The first of these is a check on the authenticity of the request for money, to the extent that the unit 26 checks that the level of the signals read out from the card 10 exceeds a predetermined threshold value. This check is satisfied, and a signal is as a result supplied on a lead 27, only if the recording in the strip 24 has the characteristic zigzag pattern of magnetization referred to above. In general it is not possible to satisfy this check unless the head used for recording had the prescribed zigzag form of gap. Records made using a head having a conventional straight gap will not produce signal levels in the head 25 sufficient to exceed the threshold value set, and the same applies to a significant extent to recordings made using heads of a crooked configuration differeing from that of head 25.

The second check carried out in the unit 26 determines from the withdrawal-rate information read from the card 10 whether the dispensing of money to the customer would cause him to exceed the maximum permissible withdrawal rate. To this end the signals supplied by the unit 22 are decoded in the unit 26 to determine whether the date they represent is prior to the current date. If it is, and the once-in-a-day rate would accordingly not be exceeded, an output signal indicative of this fact is supplied from the unit 26 to a lead 28. The supply of this signal to the lead 28, which as described later is a prerequisite for the dispensing of money to the customer, is inhibited in the event that no signal is supplied to the lead 27. Thus the signal appears on the lead 28 after passage of the received card 10 beneath the head unit 22, only in the event that both checks carried out in the unit 26 are satisfied.

From the head unit 22 the card 10 passes beneath the stack 23 of punched-card blanks, and as shown in FIG. 1, carries with it into the imprinter 19 the lowermost blank 29. A carbon ribbon 30 fed from a supply spool 31 within the imprinter 19, is pressed downwardly by a roller 32 on to the blank 29 as this is driven with the card 10 into the imprinter 19. The card 29 is accordingly imprinted in carbon-ink with the embossed characters 11 and 12 of the card 10. The ribbon 30 is of the 'total transfer' kind, the carbon ink transferred on to the blank 29 at the embossings 11 and 12 leaving transparent windows that provide another, supplementary record of the card 10. The imprinted blank 29, providing the principal record, is not separated from the card 10 and passes through a photoelectric card-reader 33, leaving the card 10 behind in the imprinter 19.

The imprinted blank 29 passes between a reading head 34 and a platen 35 in the card reader 33. The head 34 includes five photocells (not shown) for sensing the imprints of the bar-characters 12 and providing therefrom a column-by-column readout of the imprinted decimal-encoding. Signals in accordance with the account number and expiry date read out in this way are supplied to a validity-register unit 36. The expiry date and account number are here checked to ascertain whether the card 10 is still in force and not otherwise invalid; in the latter respect the unit 36 checks the account number against the account numbers of customer's cards that are no longer valid by virtue of having been reported as lost or stolen. If the result is satisfactory on both counts, then a signal indicative of this is supplied from the unit 36 to a lead 37.

The signals representative of the account number read out from the imprinted blank 29 are also supplied from the unit 33 to an encyphering unit 38 which acts according to an involved and secret program to derive from this number the corresponding personal-identification number. The derivation of the personal-identification number from the account number within the unit 38 involves a chain-code sequence of digit-deriving steps each of which is dependent on cross-connections programmed into the unit 38. The cross-connections determine the initial condition from which the sequence begins and the manner in which during each digit-deriving step numbers dependent on an individual digit of the account number are assembled and combined with one another to produce further numbers. These further numbers are used in part to define the value to be ascribed to the digit of the personal-identification number that is being derived in the step, and also to provide feedback affecting the result of the next step in the derivation of the complete personal-identification number corresponding to the account number borne by the card 10. Signals in accordance with this derived number are conveyed to a comparison unit 39 that controls release of a bank-note dispenser 40 via a release unit 41.

The customer is not instructed by illumination of a sign (not shown) on the facia of the unit 13 to enter his personal-identification number into the system. The number, preferably of six digits, is entered using a set of ten push-buttons 42 mounted on the facia of the unit 13 and numbered 0 to 9. As the push-buttons 42 are operated one at a time to enter the digits sequentially, their values are conveyed to the comparison unit 39. In the unit 39 the manually entered number is compared digit-by-digit with the number derived from the account number in the encyphering unit 38. If there is correspondence between them and the appropriate signals are present on the leads 28 and 37 to signify that the checks as to authenticity, withdrawal-rate and validity carried out in the units 26 and 36 are all satisfied, then the unit 41 releases the dispenser 40 to dispense a single packet of bank-notes to the customer through a delivery-slot (not shown) in the facia of the unit 13. Once dispensing has taken place the card transport unit 21 drives the rollers 20 to transport the card 10 back from the imprinter 19 to be returned to the customer through the entrance 14. The head 25 in the unit 22 is appropriately energized from the unit 26 during this to record the current date (in the characteristic frequency-modulated and crooked form) in the strip 24 of the card 10, and thereby up-date the withdrawal-rate information on the card.

The unit 41 does not release the dispenser 40, and no dispensing therefore takes place, in the event that the numbers compared by the unit 39 do not correspond, or any of the three checks on authenticity, withdrawal-rate and validity carried out by the units 26 and 36, are not satisfied. In the circumstances in which there is no correspondence between the compared numbers, or the check on withdrawal rate is not satisfied, the card 10 is returned but without any up-dating of the withdrawal-rate information in this case. The card 10 is however driven from the imprinter 19 to be retained in a safe bin (not shown) within the system, in the event that either of the authenticity and validity-checks is not satisfied; the criterion for retention and the operation of the unit 21 to this end, is absence of a signal from either of the two leads 27 and 37. In all cases where there is no dispensing, the imprinted punched-card blank 29 is stamped (by means not shown) to indicate this.

The blank 29 imprinted with the information from the card 10 and retained within the system, provides a record of the transaction, whether successful or not, for the necessary accounting and checking purposes. The main basis for the dispensing operation is the information, in particular the account number, encoded on the card 10, and the fact that this is read from the imprinted blank 29 rather than from the card 10 itself, is of substantial advantage. In particular it ensures that the dispensing operation is conditional upon there being an accurate and legible record of the transaction. The use of the imprinted record 'in the loop', as an essential part of the dispensing operation in this way, is the subject of my earlier U.S. Patent application, Ser. No. 851,186, filed Aug. 19, 1969.

The security of the system as regards the dispensing of packets of money is very dependent on the security of the magnetic-checking operation performed by the unit 22 acting in conjunction with the unit 26. In particular it depends on the head 25, and further details of this will now be described with reference to FIG. 3.

Figure 3:
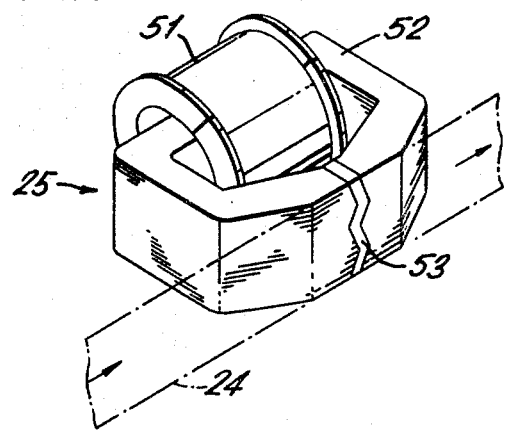
FIG. 3 shows the form, and in particular the zigzag gap-configuration, of a magnetic head used in the system of FIG. 1.

Referring to FIG. 3, the head 25 is of a conventional form, having an electrical winding 51 embracing a laminated ferromagnetic core 52, apart from the fact that the core 52 has a reading-recording gap 53 which instead of being straight, is of zigzag configuration. The gap 53, like the straight gap of a conventional head, is provided as a break in the magnetic circuit of the core 52, and although this may be left simply as an opening, it is preferably and according to normal practice, filled with a non-magnetic material.

Figure 4:
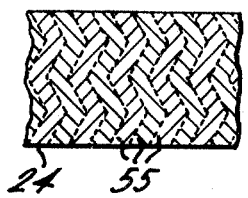
FIG. 4 is a diagrammatic representation of the pattern of magnetization characteristic of the magnetic head of FIG. 3.

The head 25 is mounted above the guideway 18 with the gap 53 extending directly across the path of the strip 24 on the card 10, so that when the winding 51 is energized the resultant magnetic field bridging the gap 53 in the core 52 intersects the strip 24 along a transversely extending band of crooked configuration corresponding to that of the gap 53. There is accordingly implanted in the strip 24 a zigzag band of magnetization. As the strip 24 passes on beneath the head 25 so there is built up in the normal way along its length a magnetic record of the variations of the energizing signal, but in the present instance the magnetization of the strip 24 varies in a pattern of successive transverse bands 55 of zigzag configuration, as illustrated in FIG. 4.

The zigzag recording on the strip 24 can be read by the head 25, or by any head having the same gap-configuration as head 25, the zigzag bands 55 of the recording coming successively into register with the gap as the strip 24 passes in the normal way beneath the head. The correspondence between the zigzag pattern of magnetization and the zigzag gap ensures that the magnetization sensed from the record at any instant is the same in both magnitude and sense across the whole width of the core 52. The signal induced in the winding 51 is therefore of a maximum level and is readily distinguishable from the signal that would be induced if the record in the strip 24 had been produced using a conventional head with a straight-gap configuration.

A head having a straight-gap configuration produces a recording having a magnetization pattern of transversely extending straight bands, so passage of such a recording beneath the zigzag gap 53 would present in the gap 53 magnetization alternating in sense across the width of choice core 52. The consequent destructive-interference effect across the gap width would accordingly result in a signal of very small, or even zero, level in the winding 51. A corresponding effect is obtained if a straight-gap head is used to read a zigzag recording. These effects apply also where a head having a crooked gap that departs substantially from the precise configuration of gap 53 is used. Although the reading by the head 53 of recordings made by a gap of this different configuration may not always result in a very low signal-level, it is in general possible by appropriate chose of gap configuration to establish a threshold level of response from the head 53 that can serve as a clear criterion for distinguishing between authentic and falsified records.

The destructive-interference effect is dependent upon the spatial wavelength of recording made and this depends on the height (measured lengthwise of the recording) of the zigzag or other gap-configuration. Provided this height is chosen to be comparable with the length of the gap (for example of the order of 0.001 inch) it is not possible for its configuration to be readily mapped and copied from the recordings it produces. The use of frequency-modulated recording as in the present equipment, reduces the possibility of mapping and copying still further. Thus provided access to the head 25, and similar heads elsewhere, is rigidly controlled, the likelihood of anyone with fraudulent intent being able to forge a card that will satisfy the magnetic check, or even with an authentic card, being able to interfere profitably with the withdrawal-rate recording, can be kept within acceptable bounds. Even if the gap configuration is discovered the cost of constructing a head having this, so that a falsified recording can be made, may in itself provide a significant and valuable discouragement to fraud.

Discrimination between authentic and falsified records can be increased by including a frequency filter in the unit 22, the filter having a narrow pass-band such that response of the unit 22 and thus of the unit 26, is confined to recordings having the spatial wavelength characteristic of recordings by the head 25.

The crooked gap of the head 25 used in the unit 22 need not be of the uniform zigzag configuration shown in FIG. 3. In this connection, when the term "crooked∞ is used herein to describe the gap, it is to be understood that it is intended to refer to the configuration of the gap over its width, i.e. the dimension generally transverse to the direction of relative movement between the magnetizable medium and the magnetic reading head. More specifically, a "crooked" gap is not intended to include a gap which is straight along its width but is merely inclined at an angle other than the usual 90° to the direction of relative movement between the magnetizable medium and reading head. The desired effect may also be obtained using a smoothly undulating form. Additionally, there need not be a plurality of bends or changes in direction across the width of the head; the gap may be for example of a simple V-configuration. Furthermore, successive sections of the gap across its width may be provided by separate heads; for example, a simple gap of V-configuration may be defined by two straight-gap heads positioned very closely side by side with their gaps obliquely oriented in opposite senses to the path of the strip 24.

The once-in-a-day withdrawal-rate used in the system described above is simple in that it enables the necessary record of prior use to be recorded on, and read from, the customer's card as a single date. Clearly where a withdrawal-rate allowing a plurality of withdrawals in any period, is prescribed, more data will normally be involved. For example, a withdrawal-rate of three times in any one day, or ten times in any period of seven days, might be prescribed, but in any case, the operation of the system described above in monitoring and up-dating the withdrawal-rate data recorded on the customer's card remains essentially the same; the only significant difference lies in the necessity to deal with, and process, more data.

It may be desirable to limit the extent to which the customer's card may be used, for example to limit its use to fifty withdrawals. This limitation, which may be provided in addition, or as an alternative, to the rate-of-use limitation, may be effected by recording an appropriate number of pulses on the card and erasing one of these on each successful transaction, the equipment acting to detect the existence of one or more pulses remaining on the card before each transaction and to inhibit operation of the dispenser 40, and retain the card, in the event that there are none. The pulses may be recorded magnetically using a magnetic head with a crooked gap-configuration, and the unit 22 in the card-reception unit 13 may then include a corresponding head simply for detecting the recorded pulses; the erasure can be effected using a normal straight-gap head that is energized to erase from the card 10 the first pulse detected by the crooked-gap head. The head with the crooked gap used in these specific circumstances is required only to read and not to record, and in this case may be constructed to have an inherently poor recording characteristic so that even if it is stolen it is of little value for fraudulent purposes.

Figure 5:
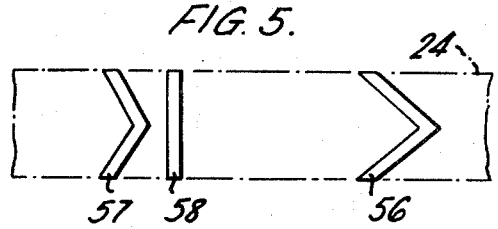
FIG. 5 serves to illustrate an alternative gap-configuration, and the manner in which two sets of data recorded on the token may be dealt with, in the system of FIG. 1.

The arrangement of magnetic heads in the unit 22 to provide for checks on both the rate and extent of use of the card 10, is illustrated by FIG. 5. In the case illustrated the withdrawal-rate information is recorded in the strip 24 at a position spaced along the card 10 from the recording in the same strip 24 of the extent-of-use pulses. The recordings are made by individual heads of different V-shaped gap-configurations.

Referring to FIG. 5, the head used for reading the withdrawal-rate information from the strip 24 has a V-shaped gap 56 of smaller angle than the V-shaped gap 57 of the head used for detecting the extent-of-use pulses. A head with a straight gap 58 is provided after the gap 57 along the path of the strip 24, and this is energized from within the unit 22 to erase the first extent-of-use pulse detected at the gap 57.

The difference in angles between the gaps 56 and 57 corresponds to the difference between the V-shaped gaps of the heads used for the initial recording of the withdrawal-rate and extent-of-use information on the card 10. This difference in configuration enables the two recordings to be distinguished from one another on the basis of difference in signal level at the two heads. Also for the purpose of clear differentiation between the recordings, the location of the gaps 56 and 57 in relation to one another and along the guideway 18 is chosen such that the recording of the withdrawal-rate information arrives at the gap 56 for read out concurrently with the arrival at the gap 57 of the recorded extent-of-use pulses and at a precisely time interval after passage of the card 10 fully into the card-reception unit 13.

The pulses recorded on the card 10 to provide the rate-of-use and extent-of-use information, may be recorded using a basic recording frequency of 5 kilocycles per second that is modulated to a frequency of 4 kilocycles per second during each individual pulse.

Details of an encyphering unit suitable for use as the encyphering unit 38 are described in my co-pending U.S. Patent application, Ser. No. 66,182, filed Aug. 24, 1970. Furthermore, the above-mentioned application, Ser. No. 851,186, and also U.S. Patent applications, Ser. Nos. 851,187 and 851,301 (now issued as U.S. Pat. Nos. 3,611,293 and 3,629,834) both filed Aug. 19, 1969, in the names respectively of W. E. Randall and G.E.P. Constable and of G.E.P. Constable and D. A. Lloyd, each describes a form of money-dispensing system that involves on-line communication between each of a number of money-dispensing terminals and a central station that serves to check and up-date the account-status of each customer making a request for withdrawal of money; although the system described in the present specification is not of this form, the invention is nonetheless just as applicable to on-line systems.

I claim:

1. Access-control equipment for selectively enabling access to a facility, comprising means for receiving a token presented to the equipment, security means for inhibiting unauthorized access to the equipment comprising magnetic detector means that includes means defining a magnetic sensing gap of non-straight configuration over its width, said detector means being operative to detect whether the received token carries a magnetic recording having a non-straight pattern of magnetization corresponding to said gap-configuration, release means that is operable to enable access to said facility only in the event that said non-straight pattern of magnetic recording is detected by said detector means, said sensing gap having successive parts across its width that are angularly inclined one to the other, means for transporting the received token along a path past the gap-defining means, and means mounting said gap-defining means to present said gap with at least some of said parts oblique to said path.

2. A method of enabling access to a facility by the use of a token bearing magnetically coded data thereon said method inhibiting unauthorized access to the facility and comprising the steps of:
moving a magnetizable medium and a recording-head means having a gap of non-straight configuration over its width relative to one another,
energizing said recording-head means with distinctive electrical signals to record on said medium magnetic signals whose characteristics are dependent not only on the character of said electrical signals but also on the configuration of the non-straight gap and its predetermined orientation to the direction of said relative movement between said magnetizable medium and said recording-head means,
presenting said magnetizable medium to an access facility,
in said facility moving relative to one another the magnetizable medium bearing the magnetic signals and a reading-head means having a gap with the same non-straight configuration and the same predetermined orientation as said recording-head means.
and responding only to signals generated by said reading-head means which have an amplitude above a predetermined minimum for enabling access to said facility,
whereby access to said facility is only granted in response to a magnetizable medium whose magnetic signals recorded thereon have been recorded by a recording-head means having the same non-straight gap configuration and predetermined orientation as does the reading-head means.

3. Access-control equipment for selectively enabling access to a facility, comprising means for receiving a token presented to the equipment security means for inhibiting unauthorized access to the equipment comprising magnetic detector means that includes means defining a magnetic sensing gap of non-straight configuration over its width, said detector means being operative to detect whether the received token carries a magnetic recording having a non-straight pattern of magnetization corresponding to said gap-configuration, release means that is operable to enable access to said facility only in the event that the said non-straight pattern recording is detected by said detector means, said sensing gap being of V-configuration.

4. Access-control equipment according to claim 3 wherein said detector means includes two straight-gap magnetic heads, and means mounting the two heads obliquely to one another to define the V-configuration gap.

5. An item-dispensing system comprising means providing an entrance for admitting an information bearing token to the system, token-reading means spaced from said entrance, token-transporting means for transporting the admitted token along a path to the token-reading means, said token-reading means being operative to read information from the token transported thereto, security means inhibiting unauthorized access to said facility comprising detector means which includes means defining a magnetic-sensing gap of non-straight configuration at a point along said path and which is operative to detect whether the token transported past said point to the token-reading means carries a magnetic recording having a non-straight pattern of magnetization corresponding to the non-straight gap-configuration, item-dispensing means that is operable to dispense from a reserve of items at least one such item upon each operation of the item-dispensing means, and means for enabling operation of the item-dispensing means in dependence upon the information read from the token by the token-reading means and then only if the non-straight pattern recording is detected by said detector means, said sensing gap being of V-configuration.

6. An item-dispensing system according to claim 5 including two straight-gap magnetic heads, and means mounting the two heads with their gaps oblique to one another to define the said V-configuration gap.

7. An item-dispensing system comprising means providing an entrance for admitting an information-bearing token to the system, token-reading means spaced from said entrance, token-transporting means for transporting the admitted token along a path to the token-reading means, said token-reading means being operative to read information from the token transported thereto, security means for inhibiting unauthorized access to said facility comprising detector means which includes means defining a magnetic-sensing gap of non-straight configuration over its width extending transversely of said path at a point therealong, said gap having successive mutually inclined portions that are obliquely inclined to the path length, and said detector means being operative to detect whether the token transported past said point to the token-reading means carries a magnetic recording having a non-straight pattern of magnetization corresponding to the non-straight gap-configuration, item-dispensing means that is operable to dispense from a reserve of items at least one such item upon each operation of the item-dispensing means, and means for enabling operation of the item-dispensing means in dependence upon the information read from the token by the token-reading means and then only if the non-straight pattern recording is detected by said detector means.

8. An item-dispensing system according to claim 7 wherein the sensing gap is of zigzag configuration.

9. An item-dispensing system according to claim 7 wherein said item-dispensing means is means for dispensing money at a bank.

10. An item-dispensing system according to claim 7 wherein the token-transporting means is also operable to return the token along said path from the token-reading means to said entrance only in the event that the crooked-pattern recording is detected by the detector means.

11. An item-disposing system according to claim 10 wherein said detector means includes means for energizing said gap-defining means to record magnetically on the token from said gap during return of the token to said entrance.

12. Access-control equipment for selectively enabling access to a facility, comprising means for receiving a token presented to the equipment and bearing a magnetic recording track, security means for inhibiting unauthorized access to said facility comprising magnetic detector means for detecting magnetic recording in said track, said detector means including means defining a magnetic sensing gap having a non-straight configuration over its width which extends generally transversely of said track length, said gap having successive mutually inclined parts thereof obliquely inclined to the track length, and said detector means being operative to detect whether the received token carries in said track a magnetic recording having a non-straight pattern of magnetization over its length corresponding to said gap-configuration of said detector means, and release means that is operable to enable access to said facility only in the event that the said non-straight pattern recording is detected by said detector means.

13. Access-control equipment according to claim 12 wherein the token-receiving means includes means providing an entrance for admitting the presented token to the equipment, and means operable to return the token through said entrance only in the event that the detector means detects the existence of the crooked-pattern recording on that token.

14. Access-control equipment according to claim 12 wherein the sensing gap is of zigzag configuration.

15. Access-control equipment according to claim 12 in combination with dispensing means that is responsive to operation of said release means to perform a dispensing function.

16. Access-control equipment according to claim 12 including means for reading information borne by the received token, means for entering a plural-character word into the equipment, and comparator means for detecting whether a predetermined correspondence exists between the said information read from the token and the plural-character word, and wherein said release means is means operable to enable access to said facility only in the event that both said predetermined correspondence and said crooked pattern recording are detected by said comparator and detector means respectively.

17. Access-control equipment according to claim 16 wherein said means for reading information from the received token, comprises means for making a record of information borne by the token, and means for reading from said record part at least of the information recorded thereon.

18. Access-control equipment according to claim 12 wherein said detector means is operative to read out from the token data recorded magnetically in crooked pattern on the token.

19. Access-control equipment according to claim 18 wherein said release means is operable to enable access to said facility only in the event that the data-content of the read-out satisfies a predetermined criterion.

20. Access-control equipment according to claim 19 wherein at least part of the data read out relates to the extent of permitted use of the token, and said detector means includes means to erase from the token at least part of the detected extent-of-use data.

21. Access-control equipment according to claim 19 wherein at least part of the data read out relates to rate of use of the token, and said detector means is operative to inhibit operation of said release means in the event that a predetermined permitted rate of use would otherwise be exceeded.

22. Access-control equipment according to claim 21 wherein said detector means includes means to energize said gap-defining means in accordance with updated rate-of-use data to record this data magnetically on the token from said gap.

* * * * *